Nov. 8, 1955        E. C. BOPF        2,722,874

DRAFT AND POWER CONTROL FOR AGRICULTURAL IMPLEMENTS

Original Filed May 19, 1948        3 Sheets-Sheet 1

INVENTOR.
Edward C. Bopf

Nov. 8, 1955   E. C. BOPF   2,722,874
DRAFT AND POWER CONTROL FOR AGRICULTURAL IMPLEMENTS
Original Filed May 19, 1948   3 Sheets-Sheet 2

INVENTOR.
Edward C. Bopf.
BY
atty

Nov. 8, 1955     E. C. BOPF     2,722,874
DRAFT AND POWER CONTROL FOR AGRICULTURAL IMPLEMENTS
Original Filed May 19, 1948     3 Sheets-Sheet 3
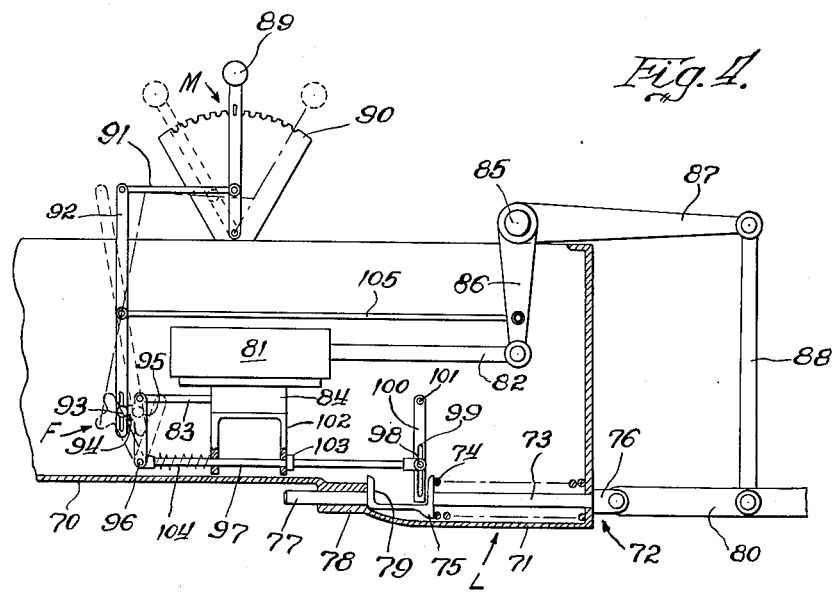
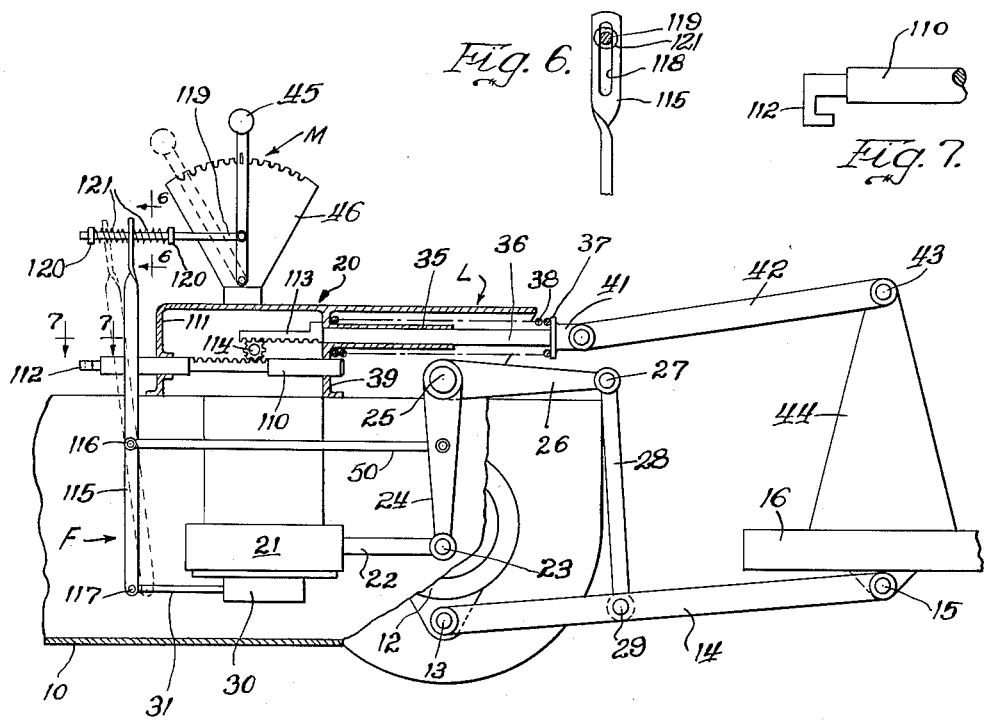
INVENTOR.
Edward C. Bopf.

United States Patent Office 2,722,874
Patented Nov. 8, 1955

2,722,874

DRAFT AND POWER CONTROL FOR AGRICULTURAL IMPLEMENTS

Edward C. Bopf, Des Moines, Iowa, assignor to Deere & Company, Moline, Ill., a corporation of Illinois Continuation of application Serial No. 27,985, May 19, 1948. This application January 10, 1952, Serial No. 265,852

7 Claims. (Cl. 97—46.07)

This application is a continuation of application Serial No. 27,985 filed May 19, 1948, now abandoned.

The invention relates to a draft and auxiliary power control for an agricultural implement and aims to provide an improvement in that type of system in which a tractor draws a plow, for example, and in which means is provided for adjusting the depth of the plow in accordance with draft force or pressure between the tractor and the plow.

A representative system of the type referred to above is shown in the several patents granted to H. G. Ferguson, typical of which is the disclosure in U. S. Patent 2,356,231. This system utilizes a fluid motor for raising or lowering the plow to adjust the working depth thereof. The motor is initially activated by operator-responsive means, such as a hand lever, to adjust the plow to a desired or optimum working depth but during the plowing operation the motor is additionally under control of a compression means variable in response to the load or pressure on the implement as the plow encounters soil of varying density, the result from the latter control being that the plow is caused to operate at varying depths according to conditions affecting the draft force or pressure required from the tractor to move the plow. For example, the plow may be set or adjusted by operator-responsive means (e. g., hand lever) to cut at a predetermined depth, which will require a certain or optimum draft force and this depth will be maintained during plowing as long as the selected or optimum draft force or pressure is not increased or decreased. If the hand lever is not changed by the operator, the draft force or pressure may be affected only by factors extraneous to or other than operator-selected adjustments of the plow, such as by soil conditions encountered by the plow, by swales and hummocks in the ground over which the tractor travels, or by soil conditions that affect the ability of the traction wheels to drive the tractor. Since there is in the system just described no means to fix the initially selected working depth of the plow, other than a balance of soil pressure against the optimum draft force, the plowing depth may increase or decrease to such an extent and with such frequency as to seriously affect the entire pattern of plowing. For example, it may be desired to operate the plow at a constant depth of three inches. According to the system just referred to, this depth will be decreased in the event that the plow momentarily encounters increased resistance in the soil, even though the tractor has the ability to pull the plow through the particular area. On the other hand, the depth of cut will be increased should the traction wheels momentarily encounter a slippery spot and lose traction.

According to the present invention, the control system is modified to give a substantially constant depth throughout relatively wide limits of operation. It is an important object of the invention to provide a control system which is first activated by the operator to select a depth of cut of the plow or comparable tool and which system is automatically deactivated in response to the attainment by the plow of the selected position rather than in response to balancing of draft or propelling pressures, so that the selected depth will not constantly vary in response to all variations in draft or propelling pressure. It is an important object of the invention to provide a control system in which the depth of cut of the implement will not decrease, regardless of variations in draft pressure, as long as the tractor has the ability to maintain the desired depth of cut. A further object of the invention is to provide a control system that combines all the advantages of a constant-depth or position-responsive system (see Worstell 2,477,710) with the advantages of a variable-depth or load-responsive system (Ferguson, supra). Fundamentally, the system here is under the control of three influencing factors: First, initial selection by the operator; second, the position of the tool; and third, the load on the tool. The mechanism influenced by the second factor operates conjointly with either of the other two.

The foregoing and other important objects and desirable features inherent in and incompassed by the invention will become apparent as the following detailed description sets forth certain modified forms that the invention may take, reference being had to the accompanying sheets of drawings, in which Figure 1 is a representative illustration of one form of the invention, the view being a side elevation, partly in section, of the rear portion of a tractor to which a plow is connected;

Figure 4 is a fragmentary side view, partly in section, showing a modified form of the invention;

Figure 5 is a similar illustration of a still further modified form of the invention;

Figure 6 is an enlarged fragmentary view taken substantially on the line 6—6 of Figure 5; and Figure 7 is an enlarged fragmentary view taken substantially on the line 7—7 of Figure 5.

Figure 1:
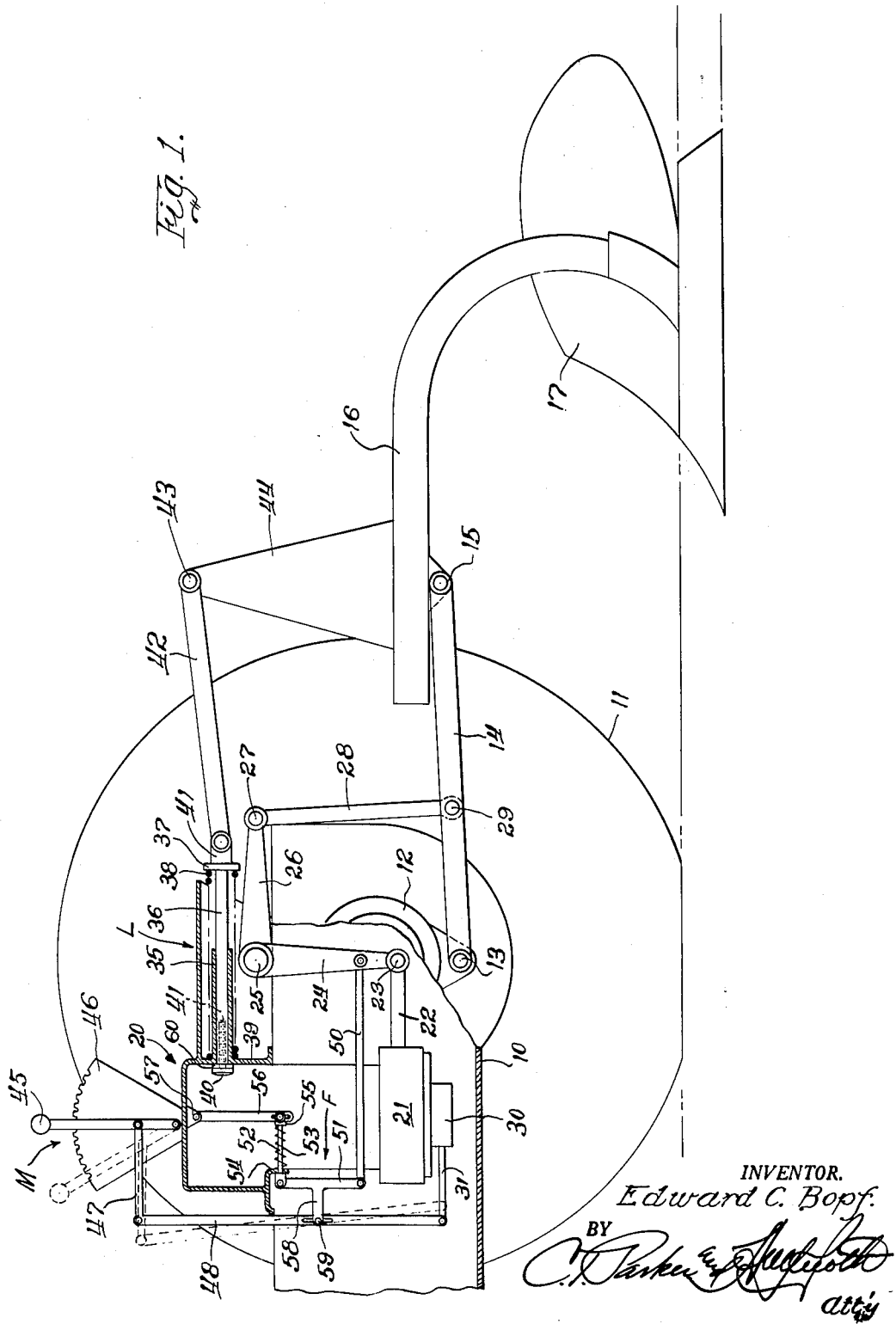
Figure 2:
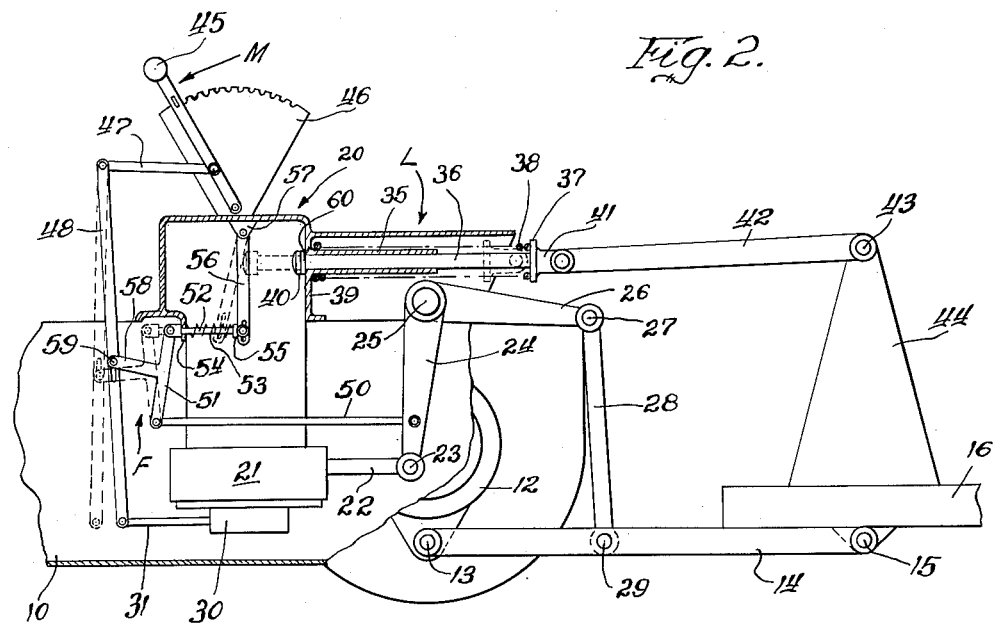
Figure 2 is a fragmentary illustration of certain of the parts illustrated in Figure 1, but with these parts in different positions.
Figure 3:
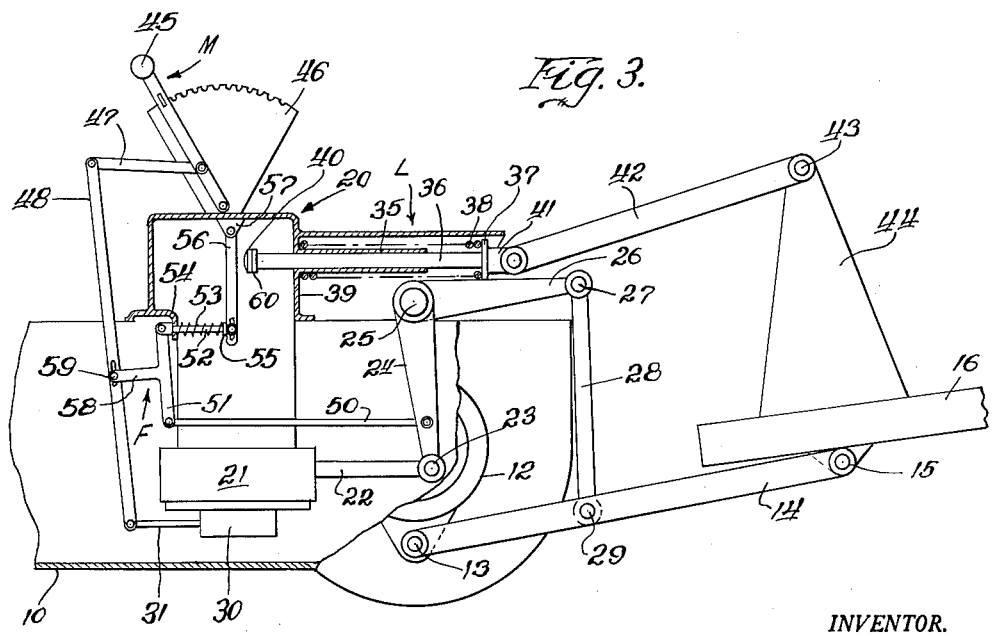
Figure 3 is an illustration similar to that in Figure 2, but showing the parts in still other positions.

*Figures 1, 2 and 3*

The agricultural implement and tractor unit shown is only representative of many types of agricultural machines with which the invention could be used and preferably comprises a power source in the form of a tractor or propelled frame having a main body 10 carried on rear traction wheels 11 (only one of which is shown) by means of a rear axle structure 12 to which is pivoted at 13 the forward end of a rearwardly extending tension link or drawbar 14. The rear end of the link 14 is connected by a pivot at 15 to a ground-working tool comprising a plow including a plow beam 16 and a plow bottom 17. The pivots at 13 and 15 constitute articulate means providing for vertical movement of the plow relative to the tractor.

In the drawings, a side portion of the tractor body has been broken away to expose the control unit, which is designated generally by the numeral 20. This unit may take the form of an integral casting mounted at the top face of the body 10 and depending within the interior of the body to carry control apparatus or mechanism for raising or lowering the implement both in response to the direction of the operator and in response to variations in draft or propelling pressure, as will be hereinafter more fully brought out. The lower portion of the unit 20 carries, as a representative form of power-operated adjusting means, a fluid motor comprising a cylinder 21 and a force-transmitting member such as a rearwardly extending piston rod 22. This piston rod is pivotally connected at 23 to one arm 24 of bell crank means including a tool-adjusting or lifting and lowering member in the form of a transverse rockshaft 25 and a second arm 26. The second arm extends rearwardly and is pivotally connected at 27 to the upper end of a lifting link 28 which is in turn pivotally connected at 29 to a mid-portion of the tension link 14.

The fluid motor 21—22 is preferably of the two-way type and functions to raise or lower the implement through the medium of the bell crank 24—26, rockshaft 25 and link 28. The fluid motor may also be of the one-way type, to which fluid is supplied to raise the implement and from which fluid is exhausted to allow the implement to descend by gravity. The particular type of fluid motor employed is immaterial and any other suitable type of power-operated means may be used. For the present purposes, it may be assumed that the fluid motor 21—22 is of the two-way type, as aforesaid, and is under control of an actuator member, here a suitable valve contained in a housing 30 attached to the cylinder 21 and having a selectively positionable control member in the form of a shiftable valve member (not shown but which may be of any conventional design) connected to and under control of a forwardly extending valve control rod or link 31, it being understood that the valve or control member will have a central neutral or "hold" position from which it may be shifted selectively in either direction to either of two active or actuating positions, ("raise" and "lower"), these details being largely conventional and theerfore not illustrated as to specific form.

The upper portion of the unit 20 provides for the arrangement of load-responsive means L and to this end includes a rearwardly extending sleeve 35 preferably cast integrally therewith and carrying for limited reciprocation therein a longitudinally extending compression rod or load-responsive member 36, which is movable fore-and-aft responsive to movement of the plow bottom 17 and beam 16 about the pivot 15 as varying resistances are encountered by the plow. The rear end of the rod has a shoulder 37 against which abuts the rear end of a relatively strong compression spring 38. The forward end of the spring 38 abuts against a wall 39 of the unit 20 and the forward end portion of the rod 36 projects through an opening in the wall 39 coaxial with the bore of the sleeve 35. This forward end portion of the rod 36 is headed at 40 to provide one of the control parts for effecting activation and deactivation of the fluid motor 20—21, as will presently appear. As illustrated, provision may be made for adjustment of the head 40. A representative type of adjustment may include a tapped bore in the forward end of the rod 36 and a threaded shank on the head 40, as indicated generally by the numeral 40a. The rod 36 may be shouldered at 60 behind the head 40 to provide a stop that limits rearward movement of the rod 36. The stop 60 may be made adjustable if desired. In this respect, it should be understood that the illustration is schematic and does not show exclusively the only way in which a comparable adjustment may be accomplished.

In the normal position of the rod 36, the compression spring 38 is extended so as to cause the shoulder 60 on the rod to abut the forward face of the wall 39, the shoulder thus forming an abutment limiting rearward movement of the rod 36. The rear end of the rod 36, which includes the shouldered portion 37, includes a clevis 41 by means of which a pivotal connection is made with the forward end of a rearwardly extending compression link 42. The rear end of this link is pivotally connected at 43 to an upstanding support or mast 44 rigidly secured to the plow beam 16. The arrangement of the links 14 and 42 and their interconnection between the implement and the tractor provide a draft device for connecting the implement to the tractor for travel of the two together, the link 14 serving to transmit draft force to the tool, besides being a vertically adjustable part, and the link 42 and its connected rod 36 being a second part changeable between a first status and a second status in response to fore-and-aft yielding of the tool (at 43). The spring 38 is a yieldable device acting on the rod 36.

Raising and lowering, or vertical adjustment, of the implement may be achieved by either operator-responsive means M or load-or-draft-force-responsive means L, the former being initially selected manually at the will of the operator and the latter becoming effective automatically upon the occurrence of conditions varying the load imposed on the tractor which will, of course, vary the draft force required to be exerted by the tractor.

The operator-responsive or manually changeable means M includes, among other parts, a manually shiftable control lever or first control part 45 pivoted for fore-and-aft shifting on the control unit 20 by means of a quadrant or sector 46. The arcuate portion of the quadrant or sector is illustrated as being notched, to represent one form of means by which the lever 45 may be set or fixed in any position of adjustment, a structural element which by itself is largely conventional.

The lever 45 comprises a first force-exerting member and is effective to shift the valve member rod 31 in either direction, according to whether it is desired to raise or lower the implement or tool. For this purpose, a link 47 has its rear end pivotally connected to the lever 45 and its forward end pivotally connected to the upper end of a depending first lever member or beam 48. The lower end of the beam 48 is pivotally connected to the forward end of the valve control rod 31. Thus, the means M includes the parts 45, 47 and 48. Figure 1 illustrates the neutral positions of the lever 45, link 47, beam 48 and valve rod 31, these positions, for the purposes of illustration, being shown in connection with the position of the plow bottom 17 representative of a manually selected condition in which the plow bottom is operating at an intermediate cutting depth and as such encountering resistances imposing a certain load on the tractor and requiring a certain amount of draft force from the tractor.

The operator-changeable means M, including the manual control member or part, represented by the lever 45, is associated by means of the beam 48 with dual-function follow-up means F, which may be of any conventional type including a plurality of differentially interconnected elements so coupled that movement of any one will result in movement of that one of the others that offers the least resistance to movement, for readjusting the power means by automatically returning the control valve to its neutral position in response to the movement of the work member or piston rod 22 of the adjusting means to an extent representing adjustment of the plow to achieve the operating relationship of the plow to the soil as determined initially by the positioning of the lever 45, a structural and functional arrangement that is by itself largely conventional and commonly called "position control." The representative follow-up means shown here comprises an intermediate portion of the bell crank arm 24, to which is pivotally connected a second force-exerting member or position-responsive element, here a forwardly extending link or rod 50 which is in turn pivotally connected at its forward end to the lower end of a vertical lever member 51. The upper end of the lever member 51 is pivotally connected to the forward end of a longitudinally reciprocable link or rod 52 comprising a third force-exerting member, which is normally biased to the position shown in Figure 1 by a compression spring 53. The spring 53 operates between the rear portion of a depending apertured lug 54, formed as part of the housing structure including the unit 20, and a stop 55 on the rod 52. The rear end of the rod 52 is pivotally connected to the lower end of a depending link or control part 56 which is pivotally connected at 57 to a depending lug just below the quadrant 46 within the interior of the unit 20. The link 56 is thus suspended from the point 57 in the path of forward movement of the headed end 40 of the rod 36, and the arrangement of the parts 40 and 56 in spaced relation affords a lost-motion device or means or equivalent expedient providing for limited movement of the member 40 before it contacts the link 56, thus delaying the change of link 56 from its inactive status (Fig. 1) to its active status (dotted lines, Fig. 2). The rod 52 extends through the apertured lug or wall portion 54 to its connection with the upper end of the lever 51. The lever 51 is preferably formed intermediate its ends with an integral extension 58 which has a pivoted and slotted connection 59 with an intermediate portion of the beam or member 48 and is thus included in the follow-up means F along with the parts 50, 52 and 56.

Figure 1 shows the parts in the positions they will occupy when the plow bottom 17 is cutting at an intermediate depth, resulting in operation of the machine with a selected optimum draft force required from the tractor. In the event that it is desired to increase the plowing depth, the operator-responsive means or control lever 45 is moved forward to the position shown in Figure 2, a position also shown in dotted lines in Figure 1. Forward movement of the lever 45 will pivot the beam 48 in a counterclockwise direction about the pivot 59 on the lever 51, whereupon the beam 48 will assume the position shown in dotted lines in Figure 1. The point 59 becomes the fulcrum for pivoting of the beam 48, because the lever 51 is fixed at its lower end by means of the fixed rod 50 and is fixed at its upper end by means of the fixed rod 52 and spring 53, whereupon pivoting of the beam 48 to the dotted line position shown in Figure 1 shifts the valve control member 31 to the right, which in the instance illustrated effects the supply of fluid under pressure to the cylinder 21 to cause the work member or piston rod 22 to move to the left. In a fluid motor of the one-way type, shifting of the valve control member 31 to the right would effect the exhausting of fluid from the left-hand end of the cylinder 21 so that the implement would lower by gravity. As stated above, the fluid motor 21—22 may be of any type or may be replaced by suitable mechanical or other means so far as the broad concept of the invention is concerned. For the purposes of the present disclosure, reference may be had to any of several well-known types of fluid motors and valve means therefor.

Shifting of the valve control member 31 to the right by means of the lever 45 and beam 48 is, of course, under the direction of the operator, and the lever 45 thus constitutes a first or manual control part for activating the fluid motor 21. As the bell crank 24—26 rocks in a clockwise direction to effect lowering of the implement, the link or rod 50 causes forward displacement of the lever 51 about the pivotal connection between said lever and the forward end of the rod 52, which rod is still held in its neutral or fixed position by means of the biasing means or spring 53. Inasmuch as the lever 45 and link 47 are fixed in position by the quadrant 46, the fulcrum for the beam 48 will be the pivotal connection between the beam 48 and the link 47, whereupon forward displacement of the lever 51 by the rod 50 will result in forward displacement of the beam 48, consequently reshifting or readjusting the valve control member 31 to move the valve in the valve housing 30 to its neutral or holding position to cut off the supply of fluid pressure to or exhaust of fluid pressure from the cylinder 21. The ultimate positions of the parts after the adjustment just described are illustrated in Figure 2 in full lines. The control system just described, in so far as it includes control by the manually operative parts and automatic cutting off of the application of power to the work member 22 in response to the attainment by the member 22 of a predetermined position, closely parallels known position-responsive arrangements such as that shown in the Worstell patent (supra) or in U. S. Patent 2,515,395, issued to Frank T. Court. Such system, as far as it goes, is ideally applicable and highly efficient to the extent that it provides for selecting and maintaining the depth of cut or other adjustment of a plow or a comparable tool. However, such system does not include means for automatically adjusting the tool in response to changes in conditions that affect the draft or propelling pressure between the tractor and tool. As will appear from the description below, the present invention combines a control system of the Worstell or Court type with an additional or alternate control system of the type that operates in response to variations in draft or propelling pressure.

With the parts in the positions shown in full lines in Figure 2, the plow will be operating at its maximum depth. Since the valve in the valve housing 30 is in "neutral" during normal operation, the plowing depth will not increase, even though the draft pressure between the tractor and implement decreases because of the imposition of lighter loads on the tractor, as, for example, when the traction wheels of the tractor encounter a slippery spot in the field. On the other hand, the plowing depth will not decrease merely because of minor increases in draft pressure caused by the increase in soil pressure on the plow, as when the plow encounters heavier soil. The valve in its neutral position operates thus as a holding means for maintaining the selected operating position of the tool. Since the valve may be moved to either of its two active positions the holding means thus established is releasable. Such release can be effected here in response to operating conditions which are extraneous or additional to the setting of the operator-responsive means but which nevertheless influence the draft force requirements, as will presently appear.

In the event that the plow encounters heavier soil, the plow beam will pivot about the point 15 on the link 14, thus causing the link 42 to move the rod 36 forwardly. Such forward displacement of the rod 36 will not cause an immediate decrease in plowing depth as in the case of the Ferguson system referred to above. The different result accomplished by the present arrangement in this respect flows from the lost-motion relationship between the control part represented by the headed end 40 of the rod 36 and the associated control part comprising the suspended link 56. In other words, although increased weight of soil may be encountered which will proportionately increase the draft or propelling pressures and thus cause the plow bottom to yield at 15—36, the holding means (neutrally positioned valve in the housing 30, etc.) will maintain the working depth irrespective of yielding of the plow bottom in all amounts reflecting propelling pressures below a predetermined value, or within a range in accordance with the lost motion between 40 and 56. (Preloading of the spring 38 would produce the same result.) Stated briefly, it may be that the tractor has the ability to pull the plow through the heavier soil, in which case, it is unnecessary to decrease the plowing depth, for the condition of increased soil pressure may be only temporary.

Forward displacement of the rod 36 is, of course, resisted by the compression spring 38, and as long as the headed end 40 of the rod 36 does not displace the link 56 there will be no change in the plowing depth. In other words, the first control system (position-responsive) dominates the second (load-responsive). However, assuming that the increased soil resistance is such as to excessively increase draft pressure between the tractor and plow and thus to impose a materially greater load on the tractor, forward displacement of the headed end 40 of the rod 36 will continue until the end 40 encounters the link 56, causing forward displacement of the link 56 and a consequent forward displacement of the control rod 52, a condition illustrated by the dotted line positions of the parts in Figure 2. Forward displacement of the control rod 52 results in forward pivoting of the lever 51 about its connection with the follow-up rod 50, and the beam 48 is swung forwardly about a fulcrum established by its pivotal connection with the link 47, to the end that the valve control member 31 is shifted to the left to activate the motor 21—22 so as to cause the work member 22 to move to the right for consequent raising of the implement. Thus the second or load-responsive system dominates the first or position-responsive system.

As the implement is started on its way to a new position of decreased depth, the bell crank member 24—26 rocks in a counterclockwise direction, and thus tends, through the follow-up link or rod 50, to move the lever 51 rearwardly. The lever 51 will, of course, pivot about its connection with the rod 52, which connection may be forwardly of the normal position of the connection, as indicated in dotted lines in Figure 2. In any event, rearward displacement of the lever 51 will effect a consequent rearward displacement of the beam 48 and a further rearward displacement of the valve control member 31 so that the valve in the housing 30 is returned to neutral, thus locking the work member 22 in its new position. In this respect, the automatic position-responsive control of the system by the bell crank member 24—26 and follow-up rod 50 is the same as in a case in which movement of the work member 22 was initiated by the control lever 45.

As the implement raises to its new position of decreased depth, there will ordinarily be a consequent decrease in soil pressure, with the result that the compression spring 38 will tend to restore the compression rod 36 to its original position, thereby disengaging the headed end 40 from the link 56 and allowing the link to return to its normal position as shown in full lines in the drawings. The retraction of the member 40 with respect to the link 56 is indicated in Figure 3. In this position of the parts, the link 56 is returned to its normal position by the rod 52 and the compression spring 53. Restoration of the control rod 52 to its normal position effects rearward movement of the lever 51 and a consequent rearward displacement of the beam 48. This action results in shifting of the control member 31 to the right, consequently setting the control valve so that fluid will be supplied to the cylinder 21 to shift the work member 22 to the left, lowering the implement. In the case of a one-way fluid motor, such shifting of the valve will effect exhausting of fluid for accomplishing the same result. A similar result would be obtained by replacement of the fluid motor 21—22 with suitable other mechanism. If there is no change in the position of the control lever 45, action of the parts as described in connection with the positions of the parts assumed in Figure 3 will result in restoring of the parts to the position shown in Figure 2 (in full lines), whereupon the plow will resume operation at the depth at which it previously operated.

Considered broadly, the control system is so arranged that it will permit the plow to operate at a constant depth even though draft or propelling pressure should vary within relatively wide limits in a first range in which there is a first-phase or non-operational relationship at 40—56 (because of the lost-motion arrangement). When the propelling pressure increases to a second range beyond or in excess of the maximum of said first range, there will be brought about a second-phase or operational relationship at 40—56, resulting in shifting of the rod 52, lever 51, beam 48 and valve control rod 31, the system thus functioning to provide for variation in depth according to variations in draft or propelling pressures. Since the control of the system via 40—56—52—51—48—31 is influenced by changes in draft force required from the tractor, and since draft force requirements depend upon many extraneous factors or operating conditions other than adjustment of the tool by the hand lever 45 (soil conditions, wheel slip, obstacles in the soil, terrain, etc.), the mechanism involved at 40—56—52—51—48—31 may be considered extraneous-factor-responsive means.

The range during which the plow will maintain a constant depth can be varied by variations in springs used to replace the spring 38, by preloading the spring 38 or by adjustment of the head 40 on the control rod 36, which adjustment will, of course, vary the distance between the head 40 and the link 56. In this respect, it should be noted that the head 40 could be initially adjusted and set so as to always engage the link 56, thus enabling immediate response of the system to increased loads. Since the stop 60 is fixed to the rod 36 (or if adjustable is adjusted separately from the head 40) the abutment limiting rearward movement of the rod 36 is effective regardless of the adjustment of the headed end portion 40.

*Figure 4*

This form of the invention operates on the same principles as those described above in connection with Figures 1, 2 and 3. For the purpose of separating the descriptions entirely, a new set of reference characters will be used. The tractor is shown as including a main body 70 having a portion 71 which carries a draft means, indicated generally by the numeral 72. The draft means 72 comprises a longitudinally extending member 73 supported by the body portion 71 for fore-and-aft movement against the action of a compression spring 74. The rear wall of the body portion 71 is apertured to provide a bearing for the member 73, and the spring 74 operates between this wall portion and a flange 75 at an intermediate portion of the member 73, the effect of the spring being to urge the member 73 forwardly against a stop provided by a clevis 76 at the rear end of the member 73 and exteriorly of the tractor body 70. The forward portion of the member 73 is provided as a guide 77 carried in a suitable longitudinal bearing 78 formed as part of the body portion 71. The guide 77 is preferably formed integral with the flange 75 so as to provide a generally U-shaped structure having a pair of abutments, one of which is formed by the flange 75 and the other of which is formed by a forwardly spaced flange 79. The connection of an implement to the tractor is represented by a rearwardly extending member 80 which is pivoted at its forward end to the portion 76 of the draft member 73. The member 80 may form part of any implement such as a plow or other ground-working tool.

The tractor includes power means here shown as assuming the form of a fluid motor including a cylinder 81 and work member or piston rod 82 which may be connected to a piston (not shown) in the cylinder 81. The possible variations in the motor or power means 81—82 are the same as those considered above in connection with the fluid motor 21—22 of Figures 1, 2 and 3. The motor 81—82 is controlled by a valve control rod 83 which is shiftable to control a distributing valve within a housing 84 for the purposes of controlling the supply of fluid to or the exhaust of fluid from the cylinder 81. Broadly, the valve in the housing 84 is similar to the valve in the housing 30 previously described.

The upper rear portion of the tractor body 70 carries a transverse rockshaft 85 to which are connected a depending bell crank arm 86 and a rearwardly extending bell crank arm 87, the former of which is connected to the work member 82 and the latter of which is connected to the implement 80 by means of a link 88. A control lever 89 is pivotally mounted on the tractor body for fore-and-aft shifting on a quadrant 90, the parts 89 and 90 being comparable to the parts 45 and 46 described in connection with Figures 1, 2 and 3. Manual control of the valve control member 83 is effected by the control part comprising the lever 89, together with link 91 connected to the lever and to the upper end of a beam or lever 92. The lower end of the beam 92 is connected by means of a pivot and slot connection 93 to an integral extension 94 formed on a lever. The upper end of the lever 95 is pivotally connected to the valve control member 83. The lower end of the lever 95 is pivotally connected at 96 to the forward end of a control rod 97. The rear end of the rod 97 is pivotally connected by a pivot 98 and a slot 99 to a depending pivoted link 100, which represents a load-responsive control part comparable to the link 56 of the Figure 1 system. The link 100 depends from a pivot 101 on part of the tractor body 70. The lower portion of the link 100 is received between the flanges 75 and 79 on the draft member 73 and normally assumes the position shown in full lines in Figure 4, occupying a lost-motion position relative to the flange 79. The rod 97 is slidably supported for fore-and-aft movement by a bearing bracket indicated generally by the numeral 102. The rod 97 is provided with a stop or abutment 103 which limits forward movement of the rod. A compression spring 104 operates between the bracket structure 102 and the connection of the rod 97 with the lever 95 to bias the link 97 to the position shown in Figure 4. The beam 92 is further connected by a follow-up rod 105 to the bell crank arm 86.

Manual control of the system shown in Figure 4 is effected by the means 89, 90, 92, 95 and 83, the parts being comparable in function to the parts 45, 46, 48 and 31 of Figures 1, 2 and 3. Automatic position-responsive control of the system to discontinue the application of power to the work member 82 when the work member moves to a predetermined position results from the connection between the bell crank 86, link 105, and beam 92, a result that parallels the result obtainable in Figures 1, 2 and 3 by the parts 24, 50, 51, 48 and 31.

Operation of the control system of Figure 4 to hold the implement at a constant working depth regardless of variations in propelling pressure within a predetermined range is effected by the parts 73, 79, 100, 97, 95 and 83. In Figure 4, the dotted lines illustrate the positions of the manually controlled parts for establishing the use of the implement at its maximum working depth; and the dot-dash lines represent the positions assumed by the manually controlled parts when the implement is raised out of soil-working position.

The operation of the system is as follows: When the control lever 89 is moved forward to its dotted line position, the beam 92 is pivoted in a counterclockwise direction about the fulcrum established by the connection of the beam 92 to the control rod 105, since the latter is fixed by the static position of the bell crank 86. The pivot point 96 between the lever 95 and rod 97 is fixed by the normal position of the rod 97 as maintained by the compression spring 104. Consequently, the beam 92 effects rearward shifting of the lever 95 about the pivot 96, thereby shifting the valve control member 83 to the right and creating a condition in which the work member 82 will be moved to the left, thus rocking the bell crank 86—87 in a clockwise direction and lowering the implement 80. In the event that the implement encounters increased soil resistance, the draft member 73 will be drawn rearwardly against the action of the compression spring 74. If the increase in soil pressure is in the first range below the predetermined maximum permitted according to the spacing between the flanges 75 and 79, the flange 79 will move in its first phase and there will be no effect on the motor 81—82 and no increase or decrease of the plowing depth. However, in the event that propelling pressure occurs in the second range or exceeds the predetermined maximum, the flange 79 moves in its second phase and engages the lower end of the suspended link 100 to shift the link to the rear, thus drawing the control rod 97 to the rear against the action of the compression spring 104. Rearward movement of the control rod 97 pivots the lever 95 about its pivotal connection 93 with the lower end of the beam 92, the latter being fixed by the control lever 89 and the control rod 105. Consequently, the valve control member 83 is moved to the left, and the work member 82 moves to the right, causing counterclockwise rocking of the bell crank 86—87 to raise the implement 80. As the soil resistance to the implement drops off, the propelling pressure between the tractor and implement will drop off and the spring 74 will tend to return the draft member 73 to its normal position, following which the lever 100 will be returned to its forward position through the action of the control rod 97 and compression spring 104. As a result of such return to normal position, the upper part of the lever 95 is pivoted rearwardly about its connection at 93 with the beam 92, thus reshifting the valve control member 83 to the right and causing lowering of the implement, it being remembered that raising of the implement to its new position would naturally be followed by automatic return of the valve control member 83 to its neutral position via the position-responsive means 105—92—95 to temporarily hold the implement in its new position.

In all main respects, the structure and operation of the arrangement shown in Figure 4 parallels that described above in connection with Figures 1, 2 and 3 and reference should be had to the more detailed description of Figures 1, 2 and 3 for comparable characteristics of the two arrangements.

Figures 5, 6 and 7

The general arrangement of the tractor and implement is similar to that of Figures 1, 2 and 3. Therefore, similar reference characters will be applied to corresponding parts without repetition except in cases of important differences.

In this modification of the invention, the unit 20 is modified to the extent that it carries for longitudinal shifting therein a rack member 110, the rear portion of which extends through an aperture in the rear wall 39 and the forward end of which is slidably carried by a forward wall portion 111, projecting outwardly through the unit 20 and provided with a hooked end 112 (Figure 7). The forward end of the compression rod 36 is modified to the extent that it is provided with a cooperating rack portion 113 which is connected by a pinion 114 to the rack 110 so that forward movement of the rod 36 results in rearward movement of the rack 110. In this form of the invention, the beam 48 is replaced by a beam 115 which is pivoted intermediate its ends at 116 to the forward end of the follow-up rod or link 50. The lower end of the beam 115 is pivoted at 117 to the valve control member 31, and the upper end of the beam has a vertical slot 118 (Figure 6) which receives a link or rod 119 comparable to the link 47 of Figure 1. The link 119 extends loosely through the slot 118 and is provided with a pair of spaced apart stops 120, one ahead of and the other behind the beam. A pair of compression springs 121 completes the connection between the upper end of the beam 115 and the link 119, one spring 121 being interposed between one stop 120 and the proximate side of the beam 115 and the other being similarly disposed with respect to the other stop 120 and other side of the beam 115. The operation of the arrangement shown in Figures 5, 6 and 7 is as follows: Forward shifting of the control lever 45 moves the beam 115 forwardly about the fulcrum 116 on the follow-up rod 50, since the follow-up rod is fixed by the static position of the bell crank 24—26. Force is transmitted to the beam 115 from the control lever 45 by the spring 121 between the rear stop 120 and the rear side of the upper end of the beam 115, both springs 121 being sufficiently strong to resist compression in the face of friction in the parts used to shift the control valve member 31. Forward movement of the lever 45 lowers the implement, a result that is comparable to that achieved with the arrangement of Figures 1, 2 and 3. Rearward movement of the control lever 45 shifts the beam 115 in a clockwise direction about the fulcrum 116 so that the valve in the housing 30 activates the motor 21—22 to move the work member 22 to the right to raise the implement. The connection of the beam 115 at its upper end to the link 119 by the means 120—121 provides, in effect, a yieldable fulcrum which, for all practical purposes of operator-responsive control by the lever 45 and position-responsive control by movement of the bell crank 24—26 may be considered a fulcrum similar to that between the link 47 and beam 48 of the structure of Figures 1, 2 and 3. Therefore, it follows that the connection 120—121 is fixed for some purposes and is yieldable for purposes of accomplishing extraneous-facto-responsive control following second-range variations in draft force or propelling pressure between the tractor and implement.

Assuming that the implement is operating at a depth established by the position of the parts as shown in full lines in Figure 5, the encountering of increased resistance by the plow bottom 17 will cause pivoting of the beam 16 about the point 15, resulting in forward shifting of the compressing link 42, rod 36 and rack portion 113, which, through the pinion 114, reverses the rack 110 and draws the hooked end portion 112 of the rack 110 toward the upper portion of the beam 115. The normal or first-phase relationship between the hooked end 112 and the beam 115 is one of lost-motion or delayed action, as shown in Figure 5. When the draft or propelling pressure between the tractor and implement occurs in the second range, or exceeds the predetermined maximum, the amount of forward movement of the rod 36 will be sufficient to bring the hooked portion 112 and beam 115 into their second-phase, whereupon the hook 112 will engage and move the beam rearwardly against the action of the right hand spring 121, the lever 45 being, of course, fixed on the quadrant or sector 46. Such rearward shifting of the beam 115 will be about the point 116 as a fulcrum, resulting in forward movement of the valve control member 31 to activate the valve motor 21—22, causing the work member 22 to extend to raise the implement. As the implement reaches its new depth, the bell crank 24—26 operates through the follow-up link 50 and connection 116 to pivot the beam 115 about its yieldable fulcrum 120—121, thus restoring the value in the housing 30 to its neutral position. Then, as the increased soil resistance falls off, propelling pressure will likewise fall off and the compression spring 38 will tend to return the rod 36 to its normal position, thereby releasing the beam 115 from engagement with the hooked portion 112 of the rack member 110 and permitting the beam to be centered by the springs 121, and the compressed right hand spring 121 will urge the beam 115 forwardly about the fulcrum or pivot 116, thus moving the valve control member 31 to the right to effect lowering of the implement, just as if the manual lever 45 had been moved to the left.

Structural and functional characteristics of the arrangement shown in Figures 5, 6 and 7 are comparable to those set forth in greater detail in connection with the description of the structure and operation of the other embodiments of the invention.

*Summary*

On the basis of the disclosure of the three modifications herein, other adaptations of the invention will undoubtedly suggest themselves. It will be seen that in any case provision is made for controlling a power operated means—be it hydraulic, mechanical or otherwise—by means of three control parts, one of which is manually operated or operator-responsive, the second of which is position-responsive according to the attainment of the selected position by the power means, and the third of which is extraneous-factor-responsive (primarily load-responsive) and operated by means measuring or responsive to propelling force or draft pressure between the tractor and implement, for example, or equivalent measuring means in other apparatus of an equivalent nature. An important feature of the invention resides in the arrangement whereby a single control means, such as the valve in the housing 30 of Figure 1 or 5 or the valve in the housing 84 of Figure 4, is susceptible of control by the three control parts, the operator-responsive means and the load-responsive means being effective alternately and each operating in conjunction with the dual-function follow-up means. It will be apparent, of course, that separate systems could be interconnected on the basis of the employment of separate control valves or equivalent control means. A principal feature of the invention is the control arrangement which provides for the operation of an implement at a constant or optimum working depth within a range in which propelling forces or draft pressures vary from a predetermined minimum to a predetermined maximum, together with means providing for variable-depth operation after the maximum draft pressure has been exceeded, a system which is a substantial improvement over a system in which the working depth of an implement varies constantly and immediately with variations in draft or propelling pressure.

As previously stated, the illustrations of the various forms of the invention are rather schematic and are intended to suggest rather than to exclude possible modifications or variations in the detailed parts of the system necessary to adapt the system to tractor-implement units of existing types, either as a built-in feature or as an attachment or conversion expedient, or even, as suggested herein, as a draft device furnished as part of a tractor or other agricultural vehicle apart from any particular tool or machine, which modifications and adaptations may be made without departing from the spirit and scope of the invention.

What is claimed is:

1. In an agricultural or like unit including a mobile frame and draft-connected tool of the type in which a manual control member on the unit is selectively movable and settable to control an actuator member for a unit-carried power means connected to the tool by means of a tool-adjusting member and wherein a load-responsive member connected to the tool is movable in response to changes in draft load between the mobile frame and tool, the improvement comprising: a first lever pivoted at its opposite ends respectively to the manual control member and to the actuator member; a second lever fulcrumed intermediate its ends on the first lever intermediate the ends of said first lever; first force-transmitting means connecting one end of the second lever to the tool-adjusting member; and second force-transmitting means connecting the other end of the second lever to the load-responsive member.

2. The invention defined in claim 1, in which: the second force-transmitting means includes a lost-motion device enabling limited movement of the load-responsive member without effect on the second lever.

3. The invention defined in claim 2, in which: the lost-motion device includes a positionable element selectively changeable from a first position achieving the lost-motion relationship between the load-responsive member and the second lever to a second position in which said lost-motion relationship is eliminated and the second lever is immediately responsive to movement of the load-responsive member.

4. The invention defined in claim 2, in which: the lost-motion device includes an adjustable element selectively operative to vary the extent of the lost-motion between the load-responsive member and the second lever.

5. In an agricultural or like unit including a mobile frame and draft-connected tool adjustable as to working position by a unit-carried power lift means under control of four members consisting of a manually movable control member, an actuator member movable to activate and deactivate the power means, a position-responsive member movable in accordance with changes in the working position of the tool and a load-responsive member movable in accordance with changes in draft load between the mobile frame and the tool, the improvement comprising: a first lever pivotally connected at one end to the manual control member; a second lever having a fulcrum intermediate its ends and mounted on the first lever via said fulcrum in spaced relation lengthwise of said first lever from the pivotal connection of said first lever to the manual control member; first and second force-transmitting means pivotally connecting opposite ends of the second lever respectively to two of the aforesaid members other than the manual control member; and a third force-transmitting means pivotally connecting the fourth of said members to the first lever in spaced relation lengthwise of said first lever from both the aforesaid fulcrum and the aforesaid pivotal connection of said first lever to the manual control part.

6. The invention defined in claim 5, in which: the fulcrum of the second lever is mounted at the other end of the first lever; the two members to which opposite ends of the second lever are respectively connected are the actuator member and the load-responsive member, and the connection of the third force-transmitting means is between the position-responsive member and the first lever at a point intermediate the ends of said first lever.

7. The invention defined in claim 5, in which: the fulcrum of the second lever is mounted intermediate the ends of the first lever; the two members to which opposite ends of the second lever are respectively connected are the position-responsive member and the load-responsive member; and the connection of the third force-transmitting means is between the other end of the first lever and the actuator member.

References Cited in the file of this patent

UNITED STATES PATENTS

| | | |
|---|---|---|
| 2,356,231 | Ferguson | Aug. 22, 1944 |
| 2,366,155 | Silver | Jan. 2, 1945 |
| 2,477,710 | Worstell | Aug. 2, 1949 |
| 2,540,429 | Cordes | Feb. 6, 1951 |
| 2,631,514 | Roeder | Mar. 17, 1953 |
| 2,631,515 | McRae | Mar. 17, 1953 |

FOREIGN PATENTS

| | | |
|---|---|---|
| 599,020 | Great Britain | Mar. 3, 1948 |